United States Patent [19]

Kunsman

[11] Patent Number: 4,561,678
[45] Date of Patent: Dec. 31, 1985

[54] PIPE COUPLING

[75] Inventor: Donald R. Kunsman, Easton, Pa.

[73] Assignee: Victaulic Company of America, Easton, Pa.

[21] Appl. No.: 661,653

[22] Filed: Oct. 17, 1984

Related U.S. Application Data

[63] Continuation of Ser. No. 491,269, May 4, 1983, abandoned.

[51] Int. Cl.$^4$ .............................................. F16L 23/00
[52] U.S. Cl. ...................................... 285/39; 285/112; 285/365; 285/373; 285/409
[58] Field of Search .................. 285/112, 39, 365, 409, 285/311, 373

[56] References Cited

U.S. PATENT DOCUMENTS

| | | | |
|---|---|---|---|
| 2,362,454 | 11/1944 | Damsel | 285/112 |
| 2,787,442 | 4/1957 | Lewis | 285/39 X |
| 3,231,298 | 1/1966 | Tomb et al. | 285/365 X |
| 3,341,178 | 9/1967 | Cott | 285/39 X |
| 3,476,410 | 11/1969 | Pastva, Jr. | 285/365 X |
| 3,744,825 | 7/1973 | Cooper et al. | 285/367 X |
| 3,828,403 | 8/1974 | Perrin et al. | 285/409 X |
| 4,272,871 | 6/1981 | Weinhold | 285/409 X |

FOREIGN PATENT DOCUMENTS 1334953  7/1963  France .............................. 285/365

Primary Examiner—Thomas F. Callaghan
Attorney, Agent, or Firm—Abelman Frayne Rezac & Schwab

[57] ABSTRACT

A closure and locking device for a pipe coupling includes lugs on the juxtaposed ends of coupling segments that interfit and can be locked in a closed position by a locking pin. The lugs each provide reaction members which are employed in the pressure loading and closing of the coupling against the bias of a resilient sealing gasket contained within the segments of the coupling, with the closing accomplished with the aid of a tool which is removably engagable with the lugs of the coupling.

10 Claims, 15 Drawing Figures

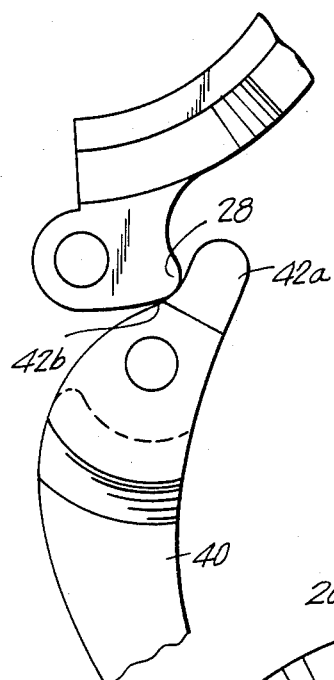
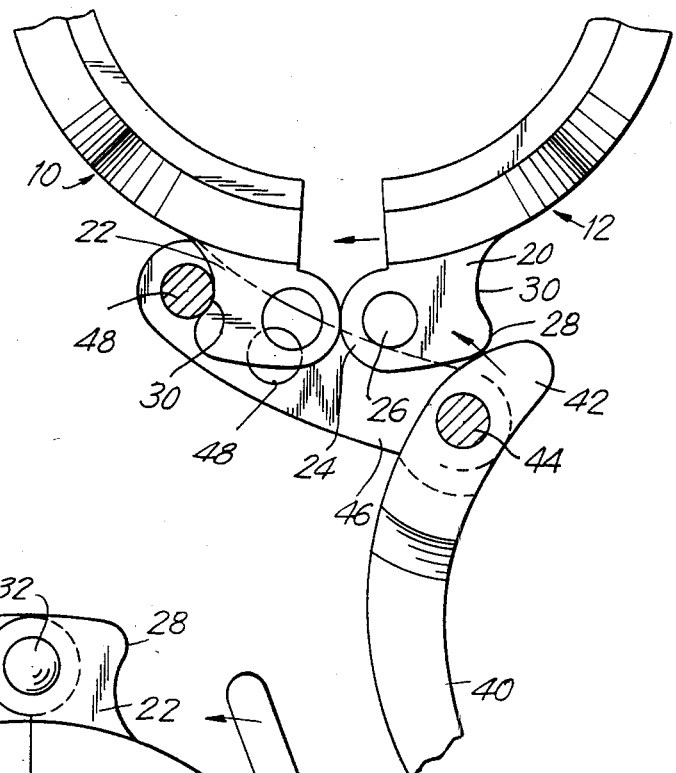
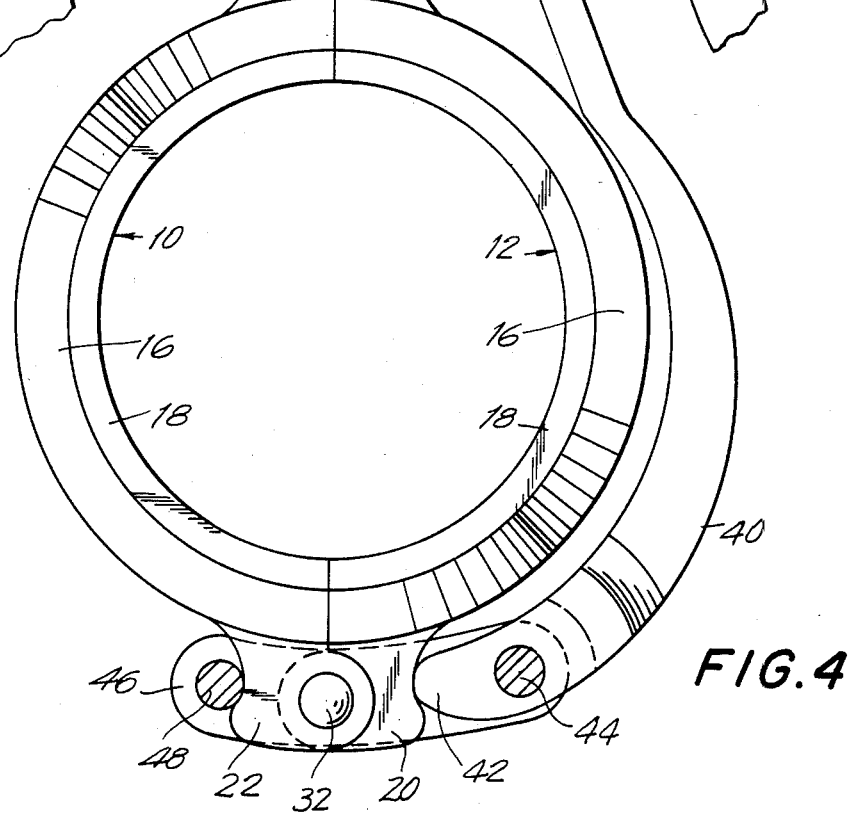

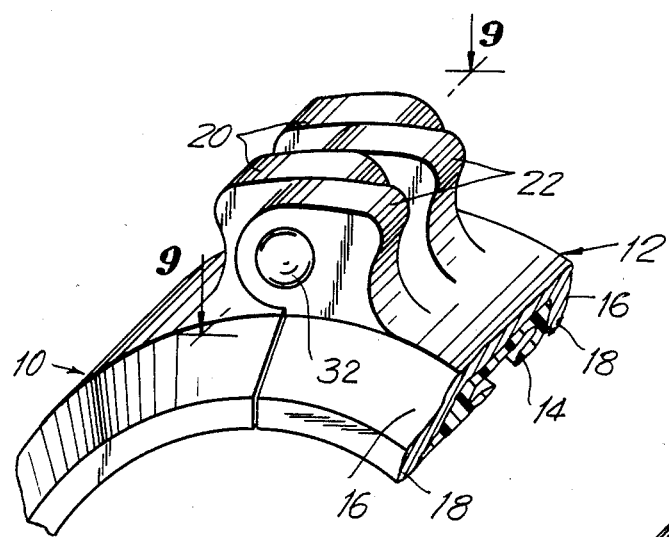
FIG.5
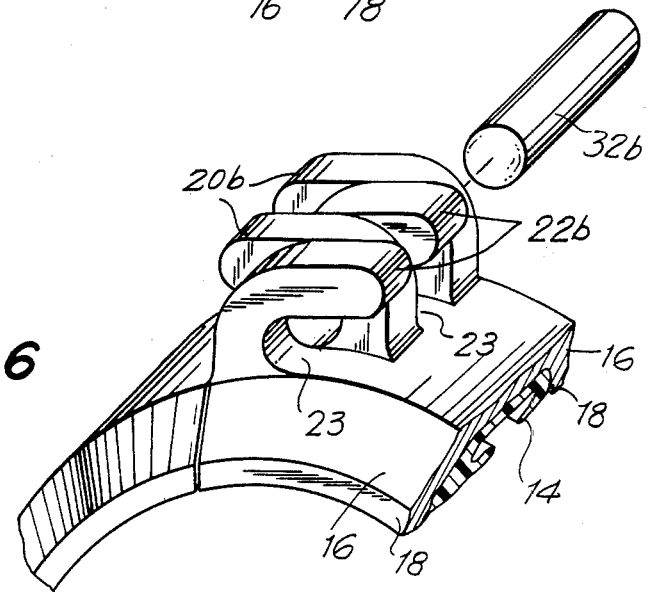
FIG.6
FIG.7
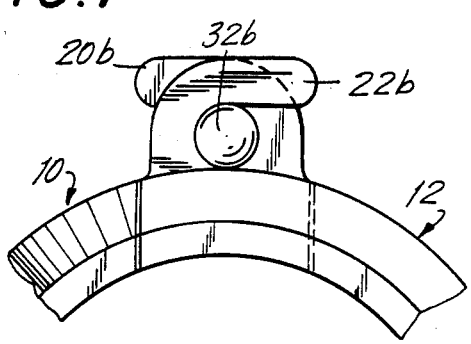
FIG.8
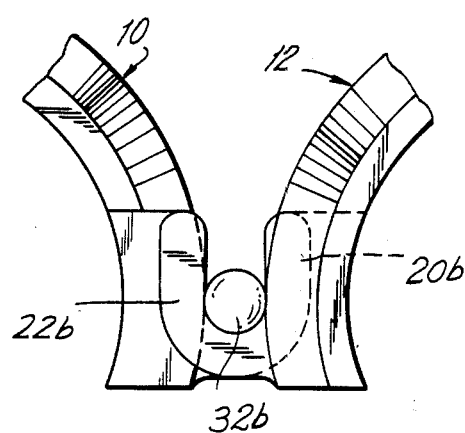

FIG. 9
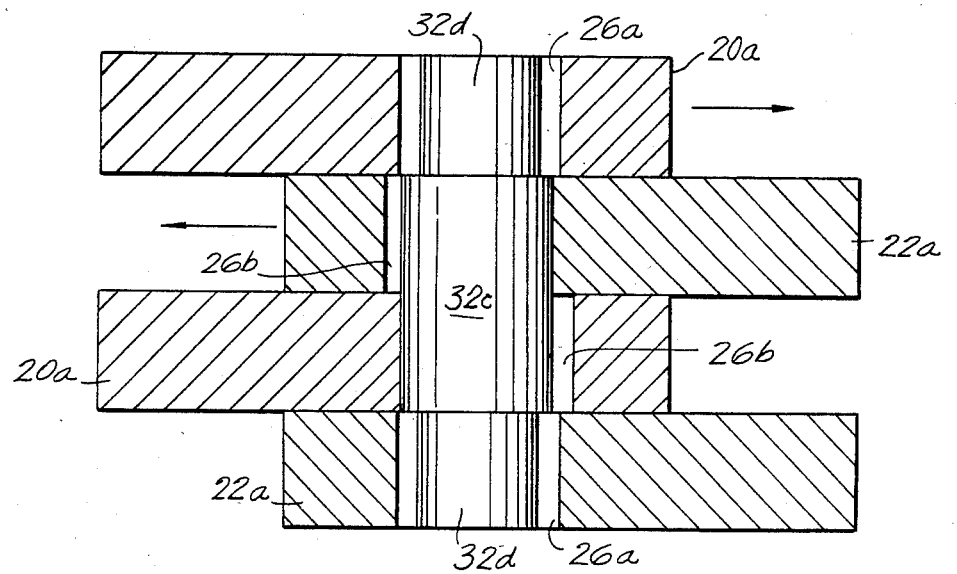
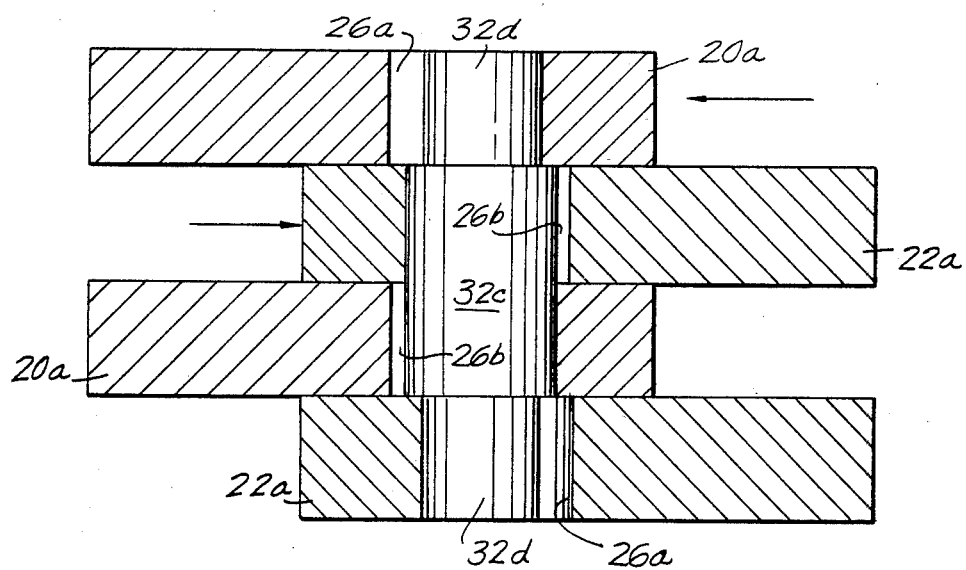
FIG. 10

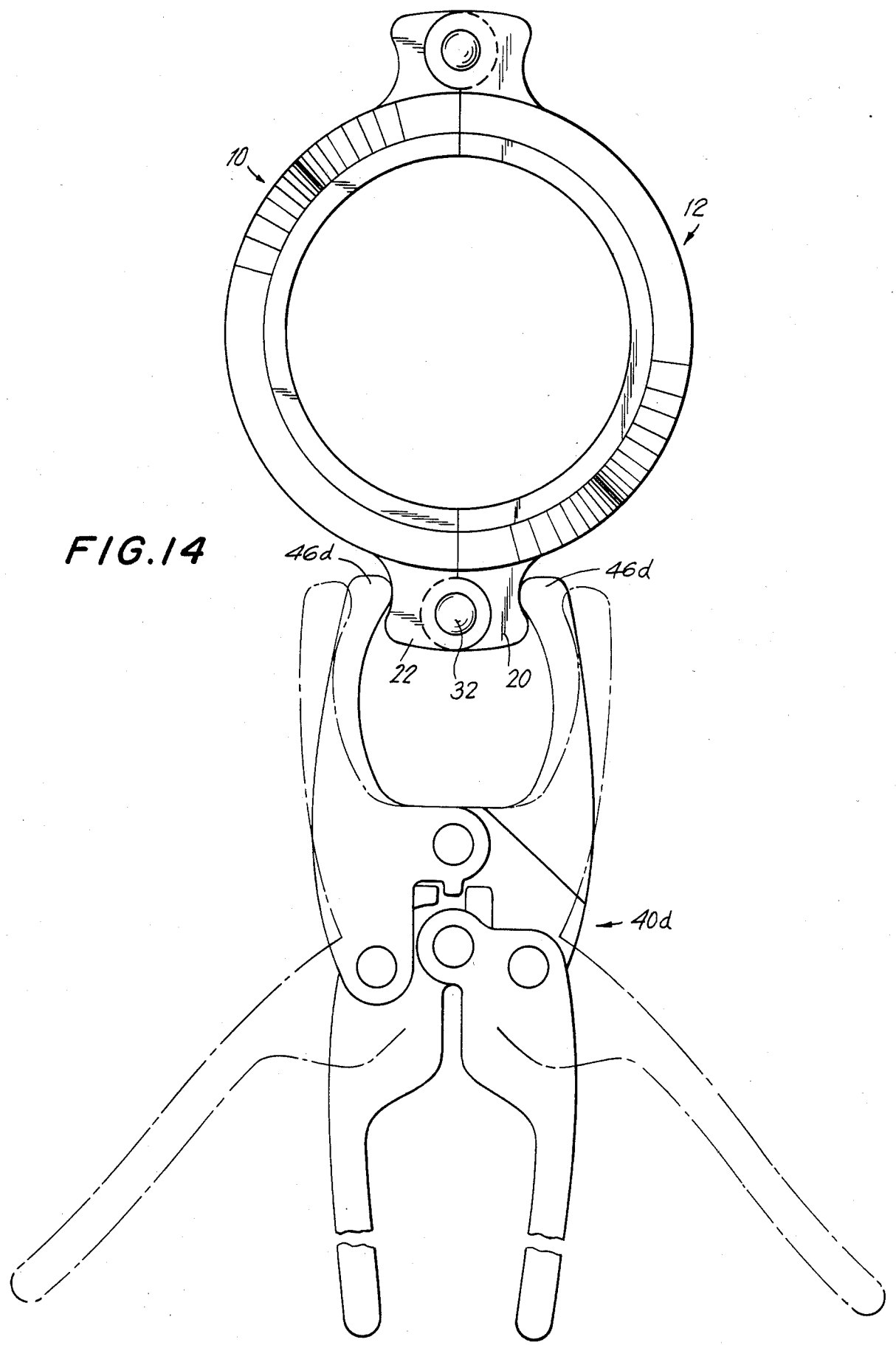

PIPE COUPLING

This is a continuation of application Ser. No. 491,269 filed May 4, 1983, and now abandoned.

FIELD OF THE INVENTION

This invention relates to a coupling for use in securing together the juxtaposed ends of pipes or fittings (hereinafter referred to as pipes) and for providing a fluid-tight seal between the pipe ends.

In particular, the invention relates to a pipe coupling having plural arcuate coupling segments having keys on their inner periphery for engagement with grooved or beaded pipe ends, and which have an internal channel in which a sealing means such as a gasket is received. The seal spans the pipe ends and segment joints, and is held in sealing relationship by the assembled coupling segments.

BACKGROUND OF THE INVENTION

Mechanical pipe couplings have found wide commercial acceptance in various industries. However, it has been desirable to increase the ease of assembly of the coupling and to enhance its resistance to unauthorized tamperings. There have been many prior attempts to resolve these problems, but none have been fully successful.

For example, U.S. Pat. No. 2,362,454, to Damsel, issued Nov. 14, 1944, discloses a pipe coupling in which the coupling segments are held in assembled condition by locking pins which extend through lugs at the ends of the coupling segments. In Damsel, assembly of the coupling is effected by means of a chain-type pipe wrench, which must be assembled about the pipe and requires a chain to be properly attached to a traction mechanism and then be placed in encircling relationship with the coupling segments. The use of such a chain-type pipe wrench in locations having limited access poses substantial problems, particularly as the wrench must be applied to the coupling segments at the time they are freely movable on the pipe exterior and unsecured relatively to each other. The workman must thus not only hold the arcuate segments in position on the pipe, but also must simultaneously position the chain of the pipe wrench over the coupling segments and hold the assemblage assembled during closure of the pipe wrench.

A more conventional closure arrangement is disclosed in U.S. Pat. No. 3,054,629, to Piatek, issued Sept. 18, 1962 in which the coupling segments are held together by bolts which are passed through bolting pads at the ends of the coupling segments. While tampering can be effected by loosening the bolts using a commonly available wrench, the construction is significantly less complicated to assemble than the more tamper resistant structure of Damsel U.S. Pat. No. 2,362,454.

It has also been proposed, to employ toggle means as a closure device for the coupling segments. For example, in U.S. Pat. No. 2,752,174, to Frost, issued June 26, 1956, a pair of coupling segments are hinged to each other at one of their ends, and a toggle linkage and a camming lug are provided at their opposite ends for use in closing and locking the coupling. This construction, while materially aiding in the assembly of the coupling, requires that the coupling segments be dissimilar in shape and that the toggle linkage be an integral part of the coupling. Further the ease of assembly results in a co-related ease of disassembly and no means are provided for locking the toggle linkage. Thus, the coupling is readily susceptible to tampering.

In U.S. Pat. No. 3,825,403, to Perrin et al, issued Aug. 13, 1974 identical coupling segments are closed by a toggle linkage which is integral with the coupling. Once closed a separate pin is provided for locking the toggle linkage against accidental release. However, the problem of tampering still remains since the toggle mechanism remains in place, and the locking pin is not under any significant shear load such as would make it difficult to remove. U.S. Pat. No. 4,272,871, to Weinhold, issued June 16, 1981, suggests that identical coupling segments which are secured by a toggle linkage be provided with bolts for securing the respective coupling segments to each other at their adjacent ends to maintain the coupling closed in the event that the toggle linkage is released. Since the toggle linkage remains secured to the mated ends of the coupling segments in a permanent fashion, each coupling requires its own toggle linkage.

In U.S. Pat. No. 3,744,825, to Cooper et al, issued July 10, 1973, closure is effected by a separate tool. While the structure proposed by Cooper et al eliminates the need for a permanently attached toggle linkage, it also precludes the possibility of forming the coupling of identical segments. Further, the discontinuous profile in Cooper et at does not permit the use of a continuous sealing gasket.

THE INVENTIVE CONCEPT

The coupling of the present invention overcomes these disadvantages and provides a pipe coupling of exceptionally neat and trim appearance, and which can readily and rapidly be asembled, the tool used in assembly of the coupling being removed therefrom subsequent to assembly of the coupling, thus substantially reducing the possibility of tampering with the coupling subsequent to assembly. The invention thus provides the advantage of a toggle linkage, without the expense of a separate integral linkage for each coupling.

These advantages are provided by the inclusion in the coupling segments of camming means adapted to permit assembled alignment of the segments by a non-integral tool, and means to position locking pins such that they are under shear loading and non-displaceable when the coupling is under pressure loading.

To these ends, the pipe coupling of the present invention includes arcuate coupling segments having engagement means on their inner periphery for engagement with juxtaposed ends of a pair of pipe members, each coupling segment having a gasket receiving channel and means for securing each coupling segment to each other coupling segment in end-to-end relationship. At least one of the securing means provides a hinge for the coupling segments, and another of the securing means provides a closure and locking means for the coupling.

The closure and locking means includes parallelly arranged lugs integral with the respective juxtaposed ends of the coupling segments and which are positioned for interfitting engagement in the closed condition of the coupling. At least one of the lugs includes a nose portion extending beyond the plane of the end of its associated coupling segment. Each of the lugs includes an end portion extending outwardly of the outer periphery of the associated coupling segment, the end portions providing reaction members for use in closure of the coupling. In the closed position of the coupling, the respective lugs are locked to each other by a locking means which extends through aligned apertures in the respective lugs.

Preferably, the hinge means in provided by an identical closure and locking means at the opposite ends of the coupling segments, and the lug means are so positioned that a coupling can be assembled from two or more identical coupling segments arranged in end-to-end relationship.

The coupling is closed by applying a suitable tool, such as a toggle linkage, to the oppositely facing camming surfaces of the associated pairs of lugs, and by drawing the interfitted lugs into a position in which the apertures thereof are in axially aligned relationship and insertion of the locking pin is permitted.

When the tool is removed subsequent to insertion of the locking pin, the compressive forces which have been imposed on the sealing gasket by closure of the coupling act reversely and impose a shear load on the locking pin to frictionally hold it captive within the interfitted lugs. The tool may then be employed for closing other couplings. Retention of the pin may also be effected by providing the pin with an expanded portion which permits an interference fit, or by employing a pin which has the form of latching means.

The apertures preferably are bores drilled through the lugs in the direction of the axis of the coupling. Alternatively, they may be re-entrant surfaces produced in the casting of the coupling segments. Preferably, the respective lugs each include camming surfaces which are provided by re-entrant surfaces produced during the casting of the coupling segments.

In the event that the respective lugs are of identical profile, then, the toggle linkage can be applied with equal facility either in a right-handed or in a left-handed manner, depending on the preference of the workman and the available access to the pipes to be coupled.

Preferably, the inter-fitting lugs at the ends of the respective coupling segments are plural in number in order that they may act together and elminate any tendency of the coupling to twist out of a plane perpendicular to the longitudinal axis of the coupling, either during application of the closure tool or subsequent to the removal thereof.

To further enhance the tamper-resistance of the assembled coupling, each of the coupling segments may be provided with plural lugs at its ends, with the apertures in the axially outermost lugs offset relative to the aperture in the (or each) axially inner lug. The apertures in the axially inner-most lugs have a diameter which is larger than the diameter of the aperture in the outermost lug by the amount of the offsetting. With this arrangement, a locking pin having a central portion of the same diameter as the aperture in the outermost lug can be inserted through that aperture and through the other apertures. By reducing the diameter of the ends of the locking pin by the amount of offsetting to produce stepped ends of the locking pin, then, when the toggle mechanism is released and expansion of the coupling by the force exerted by the compressed gasket occurs, the ends of the coupling segments will move in a direction circumferentially of the coupling by the amount of the offsetting. The larger diameter central portion of the locking pin will then be trapped between the outermost lugs and will be positively restrained against axial withdrawal. Should intentional withdrawal of the pin be required, it is merely necessary to reapply to toggle mechanism to realign the apertures, and then pass the locking pin axially out of the aligned apertures.

The invention will now be described with reference to the accompanying drawings, in which:

FIG. 3 is a fragmentary side elevation of the coupling of FIG. 1 showing a toggle linkable in operative position for closing the coupling;

FIG. 3a illustrates a modification of the toggle lever of FIG. 3;

FIG. 4 is a side elevation of the coupling of FIG. 1, when in a fully closed and locked condition, and prior to the removal of the toggle linkage;

FIG. 5 is a fragmentary perspective view of an alternative form of the lugs used in the interconnection of the coupling segments;

FIG. 6 is a fragmentary perspective view of another alternative form of the lugs used in the interconnection of the coupling segments;

FIGS. 7 and 8 are fragmentary side elevations of the coupling of FIG. 6 illustrating the manner of insertion of a pin for it to provide a hinge for the coupling segments;

FIG. 9 is a section taken on the line 9—9 of FIG. 5 of showing in exaggerated scale a modification of the locking pin and of the cooperating lugs in their position prior to release of the lugs by the toggle linkage;

FIG. 10 is a view corresponding with FIG. 9, but subsequent to release of the toggle linkage;

FIG. 14 illustrates a pliers-type mechanism usable in the closing of the coupling.

Referring now to FIGS. 1 to 4, an exemplary form of coupling acording to the present invention is shown in sequential stages of assembly.

Figure 1:
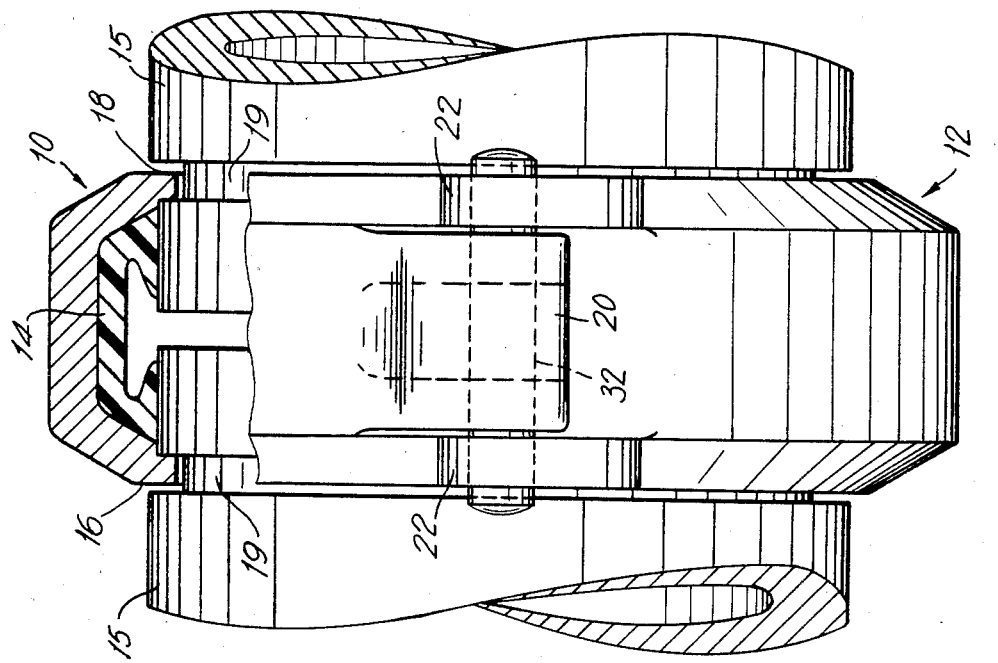
FIG. 1 is a plan view of the coupling of the invention, shown in partial section and applied to the juxtaposed ends of a pair of groove-ended pipes.

The coupling segments 10 and 12 are of a conventional cross-section between their ends, and, as shown in FIG. 1, each includes an arcuate channel member for the reception of a double-lipped sealing gasket 14. The gasket 14 spans the adjacent ends of pipes 15 held by the coupling, and seals against the pipe ends and prevents leakage therefrom.

The gasket itself may be of any required cross-section, and may be either a circumferentially continuous gasket, a split gasket, or, plural gasket segments which are respectively secured within and carried by the coupling segments.

The coupling segments 7–10, 12 each include radial flanges 16 which terminate at their inner periphery in keys 18 for engagement within grooves 19 in the pipe ends as shown, or, for engagement behind beads of bead-rolled pipe ends (not shown). Alternatively, the coupling segments can include axially spaced keys for engagement within the respective grooves of grooved pipe ends having multiple, spaced grooves, or, for engagement on opposite sides of beads on the exterior of beaded pipe ends.

The coupling member is readily adaptable to various types of pipes and fitments, including cast, drawn, or seam welded pipe, thin walled pipe such as is typically formed from stainless steel, extruded thermoplastic pipe and the like.

Each coupling segment 10, 12 is preferably identical in all respects with each other coupling segment, the respective coupling segments being configured such that they can be assembled to each other by reversing one of the coupling segments end-to-end with respect to the other. Each coupling segment includes a lug 20 or a closely-spaced pair of lugs as indicated in dotted lines at one end thereof which can be inter-fitted between a more widely-spaced pair of lugs 22 at the juxtaposed end of the other coupling segment, as is clearly illustrated in FIG. 1. Various other arrangements of the lugs are contemplated such as the arrangements of FIGS. 5 and 6, in which the lugs at both ends of each coupling segment are identical with each other and are offset axially of the coupling segment, thus permitting inter-fitting of the lugs without the necessity of reversing one of the coupling segments end-to-end with respect to the other.

Figure 2:
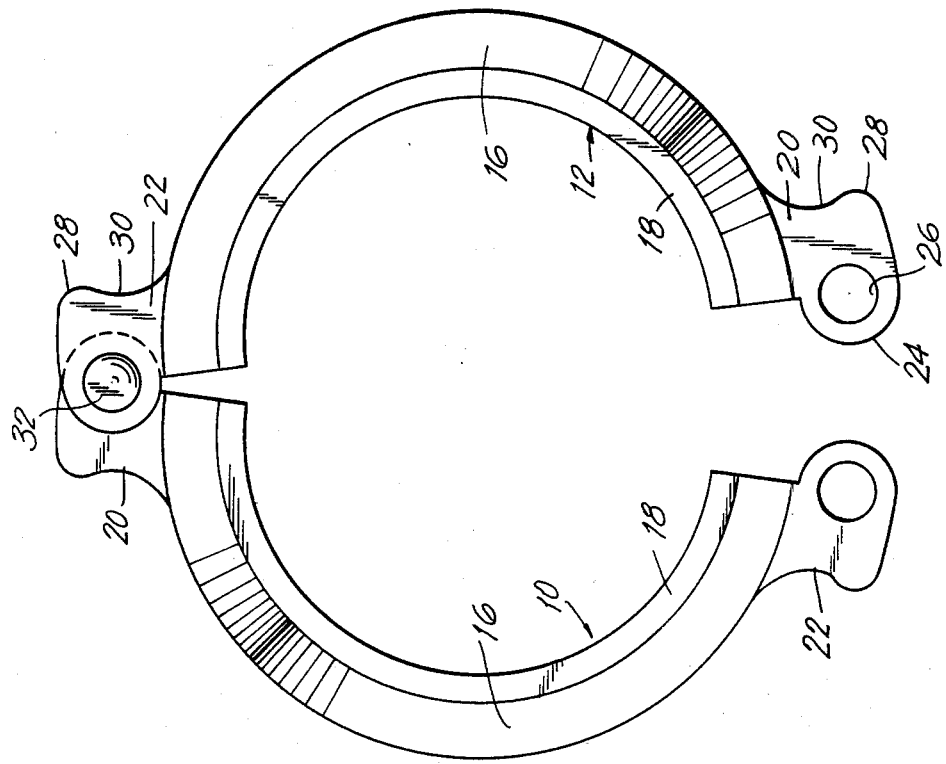
FIG. 2 is a side elevation of the coupling of FIG. 1 showing the coupling segments in a position prior to closing the coupling.

As viewed in elevation and shown in FIGS. 2, 3 and 4, i.e., in the direction of the axis of the coupling, each of the lugs is of a contour identical with the contour of each other lug, the shapes appearing in mirror image on that coupling segment that has been reversed. Each lug includes a nose portion 24 having an aperture 26 for the reception of a locking member such as pin 32, and a tail portion 28 providing a re-entrant camming surface 30.

The pin can be inserted by a workman prior to assembly of the coupling onto the pipe ends, or alternatively and as shown in FIG. 2, the coupling may be provided to the workman in partially assembled condition, with a pin driven through and held within the inter-fitted lugs at one end of the pair of coupling segments.

The coupling segments are hinged away from each other to an opened position, and are then passed over and around the pipe ends. The keys of the coupling segments are then coarsely aligned with the grooves in the pipe ends, and, the coupling segments are then moved manually towards each other to partially close the coupling up to the point where it engages the sealing gasket positioned on the pipe ends, or, up to the point where the sealing gasket segments carried by the coupling segments engage the peripheries of the pipes.

Further movement of the coupling segments in the closing direction is then resisted by the sealing gasket, or, by the partial misalignment of the keys of the coupling segments with the grooves in the pipes.

Completion of the closure of the coupling is accomplished with the aid of a separate closure tool such as the toggle linkage shown in FIG. 3. The toggle linkage of FIG. 3 includes a lever 40 having a camming nose 42 for engagement with the tail portion 28 of the lugs 20 of one of the coupling segments 12. The lever rotatably supports a hinge pin 44 adjacent its camming nose, the hinge pin 44 rigidly interconnecting a spaced pair of links 46 (only one of which appears in FIG. 3). The opposite ends of the links 46 are rigidly interconnected by a hinge pin 48, which is engaged behind the lugs 22 of the other coupling segment 10, and is loosely positioned within the re-entrant portions 30 thereof.

Upon rotation of the lever 40 in a counterclockwise direction, as indicated by the arrow in FIG. 3, the lever 40 pivots about the pin 44, and the nose 42 of the lever cams the lugs 20 towards and into inter-fitting relationship with the lugs 22, the links 46 and the hinge pin 48 providing the necessary reaction member for the lever.

To assist in initial closing of the coupling, the lever 40 can be provided with an offset camming nose 42a, which provides a re-entrant camming surface 42b, as shown in FIG. 3a. The re-entrant camming surface 42 facilitates gripping of the tail 28 of the lug by the nose 42 of the lever, and provides greater reach for the lever and the ability to nudge the coupling towards its closed position.

Continued movement of the lever 40 in a counterclockwise direction ultimately results in the camming nose 42 of the lever engaging the re-entrant camming surface 30 of the juxtaposed lug, and, the closing of the coupling against the force produced by compression of the sealing gasket. This is illustrated in FIG. 4, in which the ends of the coupling segments have been brought into engagement with each other, and the toggle linkage is over-set. In this position, the apertures 26 in the respective lugs are aligned with each other, and ready for the reception of a locking pin 32.

Each of the links 46 is provided with an aperture 48 which aligns with the apertures 26 in the lugs on reaching the over-set position of the toggle linkage, and which permits the insertion of a locking pin 32 through one of the links and into the aligned apertures. Preferably, the locking pin is slightly under diameter in order that it can readily be inserted into the apertures, and if necessary tapped into place. The locking pin is of a length sufficient for it to span the respective lugs, but is insufficiently long for it to project into the apertures 48 of the links. Thus, once the pin 32 has been properly inserted into the lugs, the toggle linkage can be removed in its entirety for re-use on another coupling, the links 46 during removal of the toggle linkage passing over the ends of the locking pin.

Upon removal of the toggle linkage, the pins 32 each are subjected to a shear force resulting from the force of expansion exerted on the coupling by the compressive force stored in the sealing gasket. The pins are thus frictionally held against axial displacement without the need for additional securing members. Upon pressurization of the assembled pipeline, the fluid pressure acting on the interior surface of the gasket acts to further increase the shear force acting on the shear pins, and effectively precludes the undesired removal of the shear pins.

In the event that removal of the coupling is desired, then, the pipeline is de-pressurized, and, the toggle linkage is re-applied to the camming lugs and is over-set, after which the locking pin can be tapped out of the apertures in the lugs, and, the toggle linkage released permitting ready removal of the coupling.

As the camming lugs of both of the coupling segments are identical with each other, the toggle linkage can be applied to the coupling members either in a right-handed or a left-handed direction, not only accommodating the particular preference of a workman, but further facilitating the use of the toggle linkage in locations having limited access.

In FIGS. 1 through 4, the lugs are illustrated as being dissimilar pairs, the lugs 20 being inter-fitted between the lugs 22. FIG. 5 illustrates an alternative arrangement, in which the lugs 20a are similar pairs arranged in staggered relationship with respect to the an identical pair of lugs 22a at the opposite end of the coupling segment. The lugs 20a and 22a in combination span the entire width of the coupling. In the embodiment of FIG. 5, the toggle linkage is applied to the coupling segments in the same manner described with reference to FIGS. 1 through 4 to permit insertion and removal of the locking pin 32a.

As the forces acting on the locking pins are in directions circumferentially of the coupling, the apertures in the lugs 20, 22 or 20a, 22a, need not necessarily be cylindrical. For example, the lugs can be hook-shaped fingers 20b or 22b, such as illustrated in FIG. 6. Also illustrated in FIG. 6, the respective lugs can be formed as finger-like portions 23 of the coupling segments which inter-fit with each other and provide extensions of the gasket receiving channel, thus providing for staggering of the line of engagement between the coupling segments, and, providing the additional benefit of deterring extrusion of the contained sealing gasket under the pressure exerted on the gasket by the pressure of fluid in the pipeline.

Conveniently, and as illustrated in FIGS. 7 and 8, a pair of identical coupling segments can be hinged to each other by inserting the lugs 22b of one of the segments into the slots of the other segment in the manner illustrated in FIG. 8, and by then rotating the respective coupling segments into the position shown in FIG. 7.

In a substantial number of uses, there exists an opportunity during assembly of the coupling over adjacent pipe ends to over-close the coupling to a limited extent. In such instances, by suitably configuring the apertures in the lugs and suitably configuring the locking pin, a self-locking arrangement can be produced, which virtually eliminates the possibility of withdrawal of the locking pins and unauthorized tampering with the coupling.

As illustrated in FIG. 9, and as related to FIG. 5, the outermost ones of the lugs 20a and 22a are provided with apertures 26a, which are of the same diameter or only slightly greater diameter than the major diameter of the locking pin 32c. The apertures 26b in the innermost ones of the lugs 20a and 22a are of slightly larger diameter than the apertures 26a, and, are slightly offset from the axis of the apertures 26a.

This poses no problems in insertion of the shear pins, as the pins are no greater in diameter than the apertures 26a in the outermost lugs, and readily can pass through the larger apertures 26b in the innermost lugs.

The locking pins 32c are formed with reduced end portions 32d as illustrated in FIG. 9, the extent of reduction of the end portions being the same as the amount of offsetting of the apertures 26b in the innermost lugs.

Upon release and removal of the toggle linkage, expansion of the coupling will occur under the influence of the compressive stresses stored in the sealing gasket. The ends of the respective coupling segments will move slightly away from each other in the direction of the arrows in FIG. 10, and, in so doing, will bring the apertures 26a in the outermost lugs into line engagement with the ends 32d of the locking pin, while at the same time the offsetting of the apertures 26b in the innermost lugs will cause the innermost lugs to move into line engagement with the central portion of the locking pin. Once the lugs have reached this position, then, the outermost lugs overlie the shoulders formed on the locking pin, and, removal of the locking pin is effectively prohibited, unless one first re-applies the toggle linkage to the lugs to realign the apertures 26a and 26b in the direction of the arrows in FIG. 9.

Figure 11:
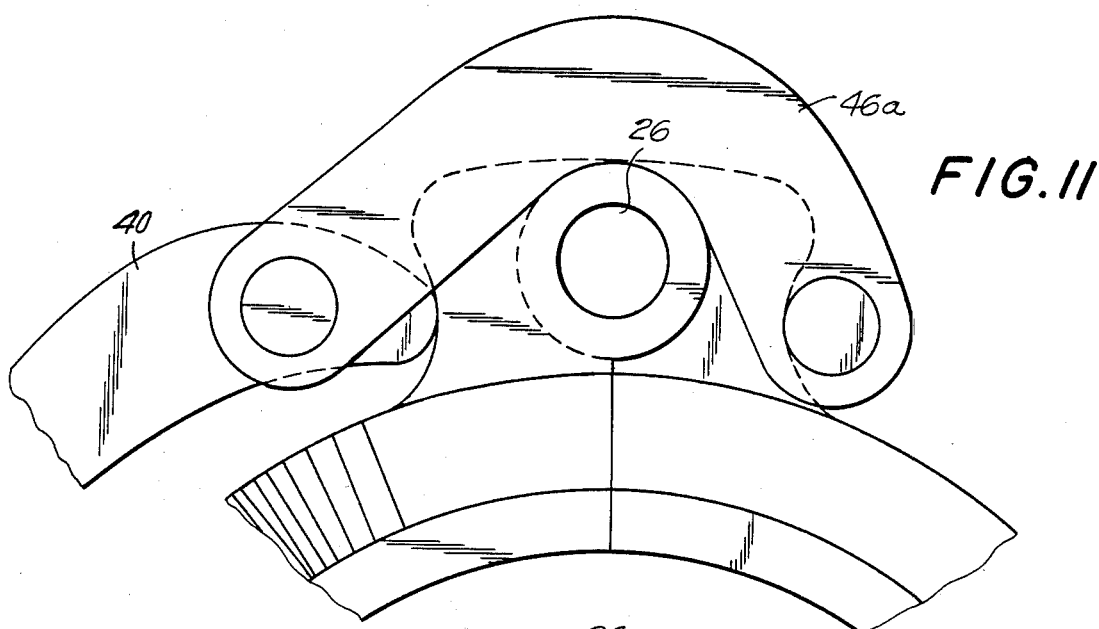
FIGS. 11, 12 and 13 illustrate modifications of the toggle linkage employed for closing the coupling.
Figure 12:
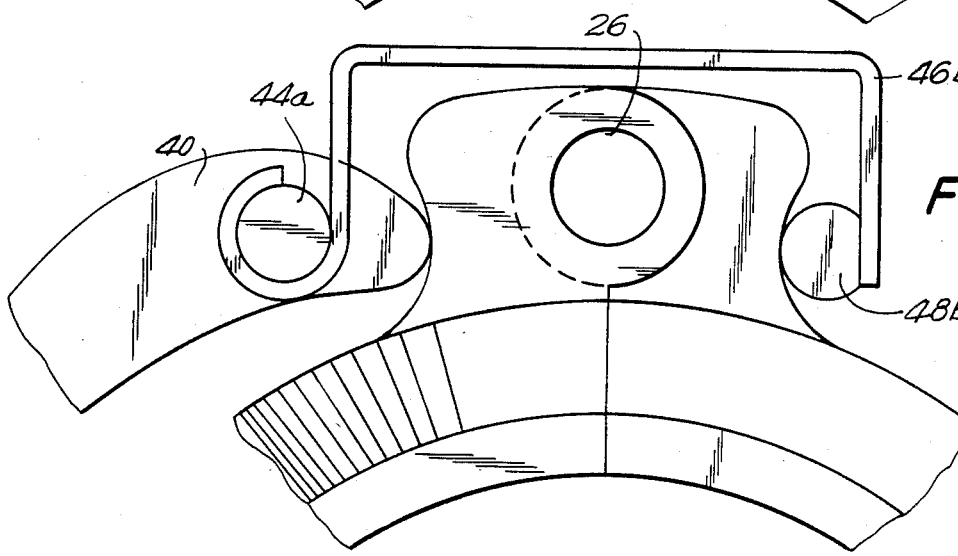
Figure 13:
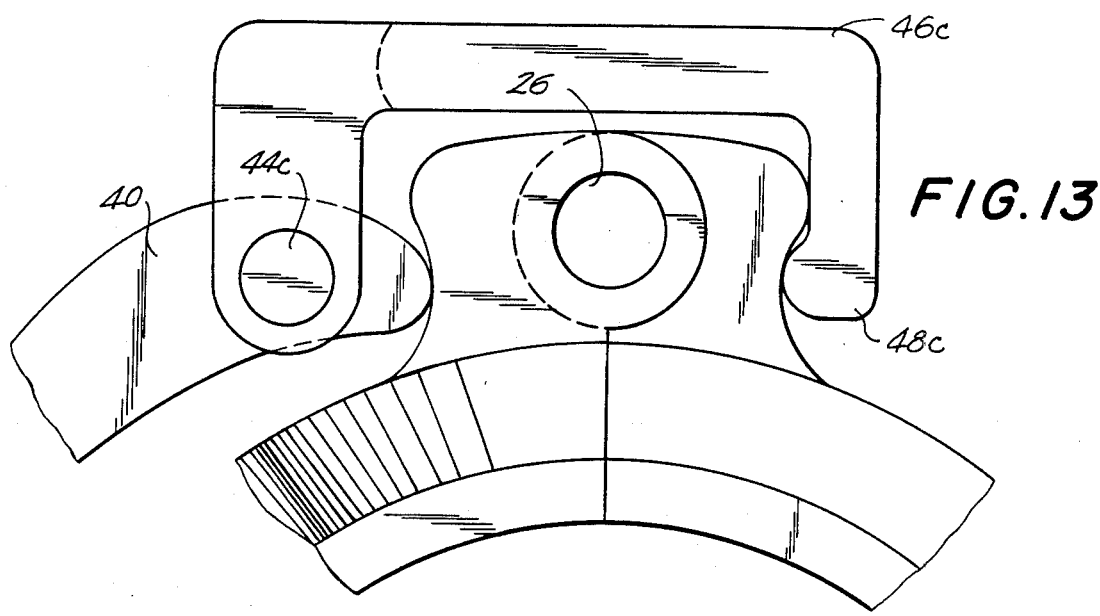

While a convenient form of toggle linkage has been described with reference to FIGS. 1 through 4 of the drawings, it will be appreciated that the toggle linkage, in particular the links 46, may take other forms, examples of which are illustrated in FIGS. 11 through 13.

In FIG. 11, the links 46 are formed as angle links, thus bridging the apertures 26 in the lugs, and obviating the necessity for providing apertures 48 in the links.

In FIG. 12, the links 46 are replaced by a single channel-section member 46b, which is pivotally connected at one of its ends to the toggle lever 40 by a hinge pin 44a carried by the lever, the other end of the channel member 46b carrying a bail 48b which performs the same function as the hinge pin 48.

In FIG. 13, the channel-shaped member is provided by a member 46c having a slot at one end for the reception of the toggle lever 40, the channel-shaped member 46c having a camming surface 48c formed integrally therewith at its opposite end, the camming surface 48c being the mechanical equivalent of the hinge pin 48.

Further, and as illustrated in FIG. 14, the toggle linkage may be in the form of a pliers-like mechanism, in which the links 46 are replaced by jaws 46d, and, the toggle lever 40 is replaced by a compound linkage indicated generally at 40d.

It will be appreciated that the structures described herein are exemplary of structures falling within the scope of the appended claims, and that various modifications may be made without departing from the scope of the invention.

I claim:

1. In a pipe coupling of the type including plural arcuate coupling segments, engagement means on the inner periphery of each said segment for securing the juxtaposed ends of pipe members, a gasket receiving channel in each coupling segment, and means securing said coupling segments to each other in end-to-end relationship, at least one of said securing means providing a hinge and another of said securing means providing a closure and locking means for said coupling, the improvement comprising:

said plural arcuate segments being of identical shape and configuration with each other;

said closure and locking means including;

parallelly arranged lugs extending radially outwardly of each end of each said coupling segment, said lugs being arranged and positioned for inter-fitting inter-engagement of the lugs at the juxtaposed ends of the coupling segments in the closed condition of said coupling;

a nose portion of at least one of said lugs extending beyond the plane of the associated end of its associated coupling segment and providing said inter-fitting inter-engagement of said lugs;

an undercut end portion of each said lug extending outwardly of the outer periphery of the associated coupling segment and facing oppositely from the adjacent end of the associated coupling segment, said undercut end portions being of identical contour when viewed axially of the associated coupling segment, said oppositely facing undercut end portions each providing for the temporary reception and location of a separate and independent toggle linkage used in closure of the coupling and providing reaction members for said toggle linkage during closure of said coupling; and locking means extending transversely of said lugs through aligned apertures in the interfitted pairs of lugs and locking said coupling in its closed condition;

each of said lugs, in the assembled condition of the coupling, presenting an external contour when viewed axially of the coupling that is symmetrical on each opposite side of said inter-fitted lugs.

2. The pipe coupling of claim 1, in which said apertures are provided by re-entrant surfaces of said end portion.

3. The coupling of claim 1, in which said apertures are provided by bores through said lugs.

4. The coupling of claim 1, in combination with a tool for closing said coupling and which is operative to force the respective lugs into inter-engagement with each other.

5. The combination of claim 4, in which said tool comprises a toggle linkage separate from and detachably attachable to said inter-fitted lug means, said toggle linkage being engagable with said tail portions and being operable to draw the respective lug means into inter-fitted relationship against the reaction force produced by compression of a resilient gasket contained within said coupling members and to permit insertion of said locking pin into said apertures, said toggle linkage being attachable to said coupling in either a right-handed or left-handed orientation, and being detachable from said coupling subsequent to insertion of said locking pin.

6. The pipe coupling of claim 5, in which the lug means at one end of each coupling segment are spaced axially of the coupling segment by a distance greater than the spacing of the lug means at the opposite end thereof.

7. The pipe coupling of claim 5, in which the lug means at one end of each coupling segment are plural in number, the lug means at the respective ends of each coupling segment being axially offset relatively to each other, each lug means at one end of each coupling segment being axially spaced from the adjacent lug means by a distance at least equal to the axial thickness of the inter-fitting lugs at the opposite end of each said coupling segment.

8. The pipe coupling of claim 1, in which said locking pin has a central portion of greater diameter than the respective ends thereof, the apertures in the outermost lugs are of a diameter at least equal to the diameter of said central portion of said locking pin, and the apertures in the innermost lugs are offset relatively to the apertures in the outermost lugs and are of a diameter at least equal to the combined diameter of said central portion of said locking pin and the distance of offsetting of the respective apertures.

9. In combination, a pipe coupling of the type including plural arcuate coupling segments, keys on the inner periphery of each said coupling segment for engagement with juxtaposed ends of a pair of pipes, a gasket receiving channel in each coupling segment, a resilient gasket positioned within said channel, and closure and locking means for securing said coupling segments to each other in end-to-end relationship encircling said pipe ends:

said plural arcuate segments being of identical shape and configuration with each other;

said closure and locking means including;

parallelly arranged lugs extending radially outwardly of each end of each said coupling segment, said lugs being arranged and positioned for inter-fitting inter-engagement of the lugs at the juxtaposed ends of the coupling segments in the closed condition of said coupling;

a nose portion on at least one of said lugs extending beyond the plane of the associated end of its associated coupling segment and providing said inter-fitting inter-engagement of said lugs;

an undercut end portion of each said lug extending outwardly of the outer periphery of the associated coupling segment and facing oppositely from the adjacent end of the associated coupling segment, said undercut end portions being of identical contour when viewed axially of the associated coupling segment, said oppositely facing undercut end portions each providing for the temporary reception and location of a separate and independent toggle linkage used in closure of the coupling and providing reaction members for said toggle linkage during closure of said coupling;

locking means extending transversely of said lugs through aligned apertures in the inter-fitted pairs of lugs and locking said coupling in its closed condition;

each of said lugs, in the assembled condition of the coupling, presenting an external contour when viewed axially of the coupling that is symmetrical on each opposite side of said inter-fitted lugs; and, a toggle linkage separate from, and detachably attachable to said inter-fitted lug means, said toggle linkage being engageable with said oppositely facing camming surfaces and operable to draw the respective lug means into inter-fitted relationship against the reaction force produced by compression of said resilient gasket to permit insertion of said locking means into said apertures, said toggle linkage being detachable from said coupling subsequent to insertion of said locking pin.

10. The combination of claim 9, in which said toggle linkage includes a toggle lever having a camming nose for engagement with the camming surfaces of the lugs of one of said coupling segments, and a reaction member hingedly connected to said toggle lever at position spaced from said nose, said reaction member having a portion for engagement with the camming surfaces of the inter-fitting lugs of the other of said coupling segments.

* * * * *